Nov. 10, 1959    G. C. MEREDEW    2,912,004
HYDRAULIC ACCUMULATOR AND LIKE PRESSURE STORAGE VESSEL
Filed June 13, 1955    2 Sheets-Sheet 1

INVENTOR
GEORGE CHARLES MEREDEW

BY Watson, Cole, Grindle & Watson
ATTORNEYS

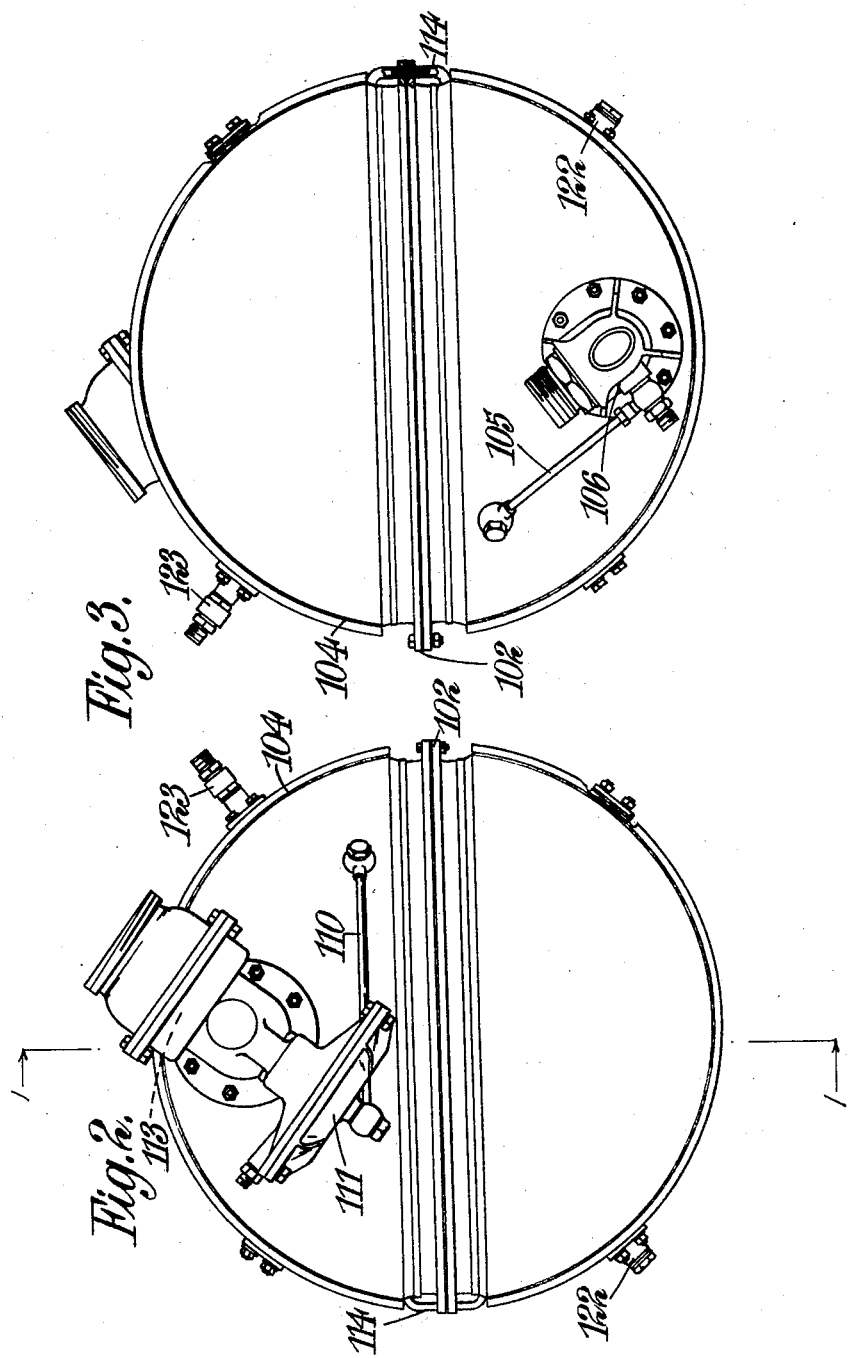

United States Patent Office 2,912,004
Patented Nov. 10, 1959

2,912,004

HYDRAULIC ACCUMULATOR AND LIKE PRESSURE STORAGE VESSEL

George Charles Meredew, London, England, assignor to Bernard Bercovitz, Toronto, Canada Application June 13, 1955, Serial No. 514,931

Claims priority, application Great Britain June 16, 1954

2 Claims. (Cl. 137—561)

The invention relates to hydraulic accumulators and like vessels for storing a supply of liquid under pressure and constitutes an improvement in, or modification of, the accumulator described in specification No. 2,676,605.

The accumulator specifically described in specification No. 2,676,605 has a cylindrical vessel or chamber of elongated shape which is divided by a circumferential boundary line into two parts, and there is a flexible bag within the chamber secured by its mouth around the boundary line. In use the bag is forced to move from a position in which it serves as a lining for one end of the chamber to a position in which it serves as a lining for the other end of the chamber. It has now been found that in order to accommodate the movement of greater volumes of fuel in larger capacity accumulators, a shallow tray-shaped bag has definite advantages particularly at lower operating temperatures. It is the object of the present invention to cater for these conditions.

The invention provides an hydraulic accumulator or like vessel as described in specification No. 2,676,605 which is of elongated form and is characterised by the feature that the boundary line which divides the chamber into two parts and around which the mouth of the flexible bag is secured, extends lengthwise of the vessel.

Preferably the liquid inlet and outlet is at one side of the boundary line of the vessel and the air inlet and outlet is at the opposite side.

It is also preferred that the vessel is mounted so that the boundary line lies, in normal attitude, in a horizontal plane, with preferably the liquid inlet and outlet at the top and the air inlet and outlet opposite thereto at the bottom.

As an example of the manner in which the invention may be carried into effect, a specific construction of an accumulator or recuperator for use in an aircraft fuel system will now be described with reference to the accompanying drawings in which:

Figure 2 is an end view of the accumulator showing the fuel inlet valve, and

Figure 3 is a view on the other end of the accumulator showing the air inlet.

Figure 1:
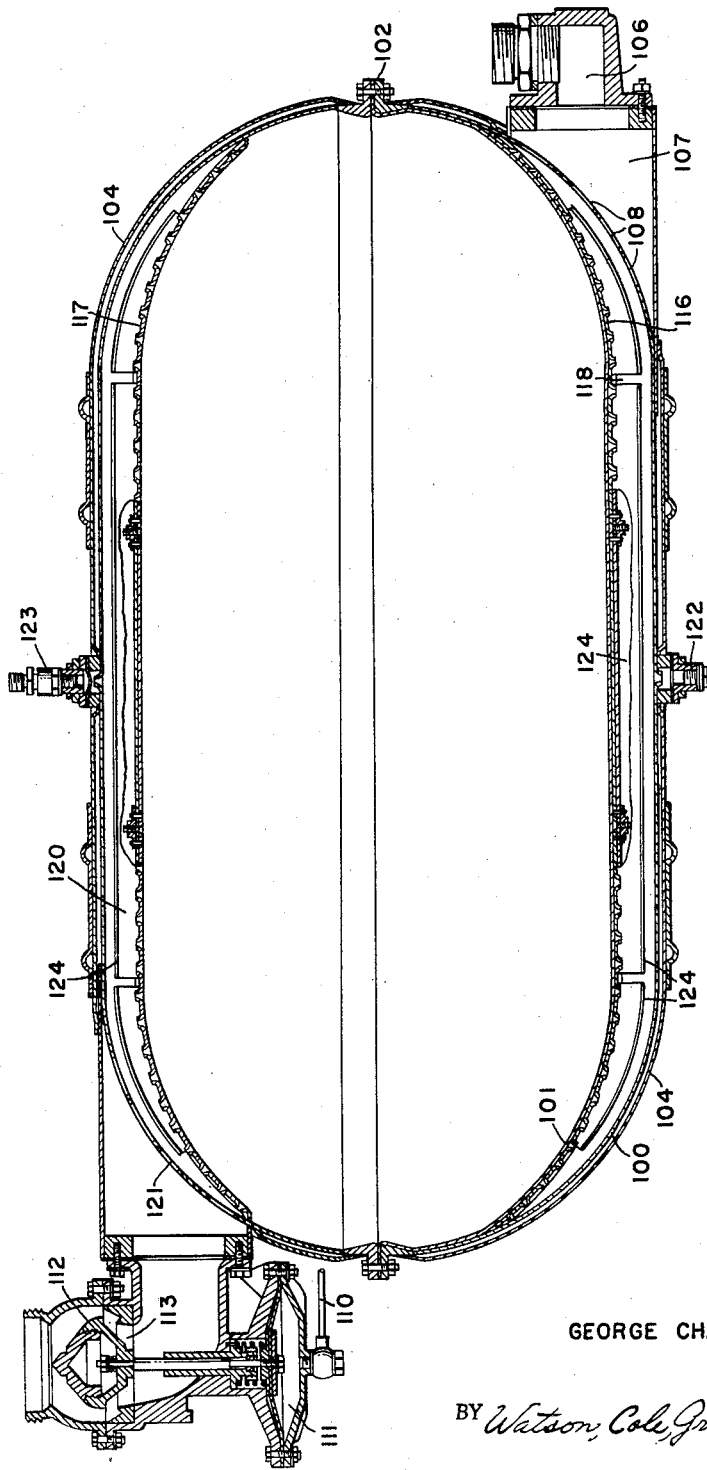
Figure 1 is a section through the accumulator on the line 1—1 in Figure 2, certain parts being shown out of their true positions, for clarity and simplicity.

The accumulator comprises a rigid vessel or chamber 100 and a flexible bag 101 therein. The chamber is of generally cylindrical form domed at its ends and is constructed of two parts of like construction secured together by a joint 102 which extends horizontally—in the normal attitude—and lengthwise of the chamber. The mouth of the bag 101 is clamped within the joint.

Substantially completely surrounding the main chamber 100 there is an outer skin 104 which is spaced a small distance from the chamber to form a jacket. The jacket has a pipe connection 105 to an air inlet and outlet fitting 106. The air inlet and outlet fitting is open to the interior of the main chamber, beneath the bag 101, through passageway 107 and holes 108. The fitting 106 may also be connected, by means not shown, to a pressure relief valve and a pressure gauge. The jacket formed by the space between the main chamber 100 and the skin 104 is also connected by a pipe 110 to the diaphragm chamber 111 of a valve 112 which, as in the construction described in specification No. 2,676,605 operates to shut off the fuel inlet and outlet connection 113 in the event of loss of air pressure from the jacket. A pipe 114 interconnects the two halves of the jacket.

Inside each half of the chamber there is a grid plate 116, 117. These plates are perforated. The perforations in the plate 116 permit air which has entered through holes 108 into the space 118 below the grid plate, to pass through the plate and so to push the bag upwardly. The grid plate serves to support the bag away from the wall of the chamber and so to maintain the space 118. In a similar manner the plate 117 serves to maintain a space 120 between the bag and the top wall of the chamber and the perforations therein permit fuel to flow into and out of the bag from and to the inlet 113 and through holes 121 in the chamber. The grid plates are stiffened by ribs 124.

In use, compressed air is admitted to the jacket from the inlet and outlet fitting 106 and through pipe 105. The air pressure in the jacket is transmitted through pipe 110 to the diaphragm chamber 111 to open valve 112. The air is also admitted through holes 108 into the space 118 through the grid plate 116 to the underside of the bag. Opening of valve 112 permits fuel to flow into the chamber above the bag. The fuel pressure is normally greater than the air pressure so that the bag becomes full of fuel and remains in the position shown (i.e. lining the bottom half of the chamber). In the event of failure of the fuel pressure, the air pressure forces the bag upwardly and so displaces the fuel through the fuel inlet and outlet connection 113 to maintain the supply to the engine. The movement of the bag is facilitated by the large area of the mouth of the bag and its shallow depth. Should the accumulator suffer damage such as to cause loss of air pressure in the jacket and diaphragm chamber, the valve 112 automatically closes, thereby isolating the accumulator from the main fuel supply to the engine.

The pipe 105 leads to the jacket space within the outer skin 104 whereas air inlet and outlet fitting 106 leads through holes 108 (see column 2, lines 27–29 and Figure 1) into the inside of the vessel (i.e. into the space 118 between grid plate 116 and the walls of the main chamber 100). The function of pipe 105 is merely to maintain pressure in the jacket. In normal use there is no consumption of pressure fluid from the jacket and no flow into and out of the jacket. The pipe 105 may therefore be made of restricted dimensions, sufficient merely to allow the pressure to build up in the jacket. This has the advantages of minimizing loss of pressure fluid through pipe 105 should the jacket be ruptured and also of ensuring that pressure is not maintained in the jacket through pipe 105 should the jacket and vessel suffer only a slight perforation.

The accumulator chamber has a drain plug 122 for water and an air bleed or release 123.

I claim:

1. An hydraulic accumulator for storing a supply of liquid under pressure, comprising an elongated closed vessel of cylindrical form with substantially hemispherical ends, a flexible bag within the vessel and secured by its mouth to the walls of the vessel along a line which extends around the vessel in the lengthwise direction thereof so as to divide the vessel into two elongated shallow trough-like parts, two trough-like perforated grids one within each part of the vessel respectively extending along substantially the whole length thereof and except at their edges, spaced inwardly from the walls of the vessel, an inlet and outlet connection for the liquid leading to the space between the grid and walls of one part of the vessel, a shut-off valve controlling the liquid inlet and outlet connection to the vessel and arranged to be biased towards the closed position in use, a jacket around at least a major part of the vessel and defining a space around the vessel within which a fluid may be maintained under pressure, means responsive to pressure in the jacket and having a pressure connection to the jacket for maintaining the shut-off valve open, whereby if the pressure in the jacket space is lost the valve shuts and prevents flow of liquid into the vessel, an inlet and outlet connection for pressure fluid leading to the space between the grid and walls of the other part of the vessel and an inlet connection for pressure fluid to the jacket space.

2. An accumulator as claimed in claim 1 in which the inlet connected to the jacket space leads from the inlet for the pressure fluid and includes a passage of restricted size.

References Cited in the file of this patent

UNITED STATES PATENTS

| | | |
|---|---|---|
| 2,097,985 | Maryott | Nov. 2, 1937 |
| 2,676,605 | Meredew | Apr. 27, 1954 |
| 2,793,793 | Sampson | May 28, 1957 |